United States Patent
Qiao et al.

(10) Patent No.: US 10,310,169 B2
(45) Date of Patent: Jun. 4, 2019

(54) DISPLAY PANEL BACKLIGHT UNIT WITH LIGHT GUIDE PLATE SHAPED TO COVER LIGHT SOURCE

(71) Applicants: BOE TECHNOLOGY GROUP CO., LTD., Beijing (CN); BEIJING BOE CHATANI ELECTRONICS CO., LTD., Beijing (CN)

(72) Inventors: Zhonglian Qiao, Beijing (CN); Zhenghua Zhang, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 505 days.

(21) Appl. No.: 15/130,297

(22) Filed: Apr. 15, 2016

(65) Prior Publication Data
US 2016/0334566 A1    Nov. 17, 2016

(30) Foreign Application Priority Data

May 14, 2015   (CN) .......................... 2015 1 0245432

(51) Int. Cl.
*G02F 1/13357* (2006.01)
*F21V 8/00* (2006.01)

(52) U.S. Cl.
CPC .......... *G02B 6/0078* (2013.01); *G02B 6/0021* (2013.01); *G02B 6/0055* (2013.01); *G02B 6/0088* (2013.01)

(58) Field of Classification Search
CPC ......... G02F 1/133603; G02F 1/133615; G02B 6/0011; G09F 2013/049; G09F 13/18; F21V 2200/20
See application file for complete search history.

(56) References Cited

U.S. PATENT DOCUMENTS 4,118,111 A * 10/1978 Laesser ............. G02F 1/133615
                                                     349/149
4,257,084 A *  3/1981 Reynolds ............... G01D 11/28
                                                     116/288

(Continued)

FOREIGN PATENT DOCUMENTS

CN          201259587 Y      6/2009
CN          201382341 Y  *   1/2010

(Continued)

OTHER PUBLICATIONS

First Office Action dated May 4, 2017 in corresponding Chinese Patent Application No. 201510245432.3.

*Primary Examiner* — Ismael Negron
(74) *Attorney, Agent, or Firm* — Nath, Goldberg & Meyer; Joshua B. Goldberg; Daniel Bissing

(57) ABSTRACT

A display panel features a backlight unit including a back plate, a light-guide with a first surface facing a display device and a second surface facing the back play, and a light-source mounted on a side of light-guide. An orthographic projection of the first surface coincides with the display device, an orthographic projection of second surface coincides with back plate, the first surface has an area larger than that of second surface such that first surface covers the light source. A plurality of the display panels might be placed adjacent to one another to form a display structure.

19 Claims, 3 Drawing Sheets

(56) References Cited

U.S. PATENT DOCUMENTS

| | | | | | |
|---|---|---|---|---|---|
| 4,945,350 | A | * | 7/1990 | Kawamura | G02F 1/133615 345/102 |
| 5,404,277 | A | * | 4/1995 | Lindblad | G02B 6/0021 313/498 |
| 5,617,251 | A | * | 4/1997 | Ohta | G02B 6/0055 349/61 |
| 5,779,339 | A | * | 7/1998 | Konishi | G01D 11/28 362/23.15 |
| 5,949,933 | A | * | 9/1999 | Steiner | F21V 5/02 362/551 |
| 7,534,025 | B2 | * | 5/2009 | Harbers | G02B 6/0073 362/23.01 |
| 8,070,346 | B2 | * | 12/2011 | Maeda | G02B 6/0068 362/620 |
| 8,085,364 | B2 | * | 12/2011 | Travis | G02B 6/0053 349/65 |
| 8,705,146 | B2 | * | 4/2014 | King | H04N 1/484 358/474 |
| 2006/0007704 | A1 | * | 1/2006 | Mori | G02B 6/0013 362/613 |
| 2007/0091642 | A1 | * | 4/2007 | Lee | G02B 6/002 362/621 |
| 2007/0127261 | A1 | | 6/2007 | An et al. | |
| 2015/0370124 | A1 | | 12/2015 | Han | |

FOREIGN PATENT DOCUMENTS

| | | |
|---|---|---|
| CN | 201382341 Y | 1/2010 |
| CN | 104090411 A | 10/2014 |
| CN | 203982037 U | 12/2014 |

\* cited by examiner

DISPLAY PANEL BACKLIGHT UNIT WITH LIGHT GUIDE PLATE SHAPED TO COVER LIGHT SOURCE

CROSS-REFERENCE TO RELATED APPLICATION

This application claims the priority of Chinese Patent Application No. 201510245432.3 filed on May 14, 2015, titled "Display panel, multi-facet display structure and display device" in the Chinese Intellectual Property Office, the disclosure of which is incorporated herein by reference.

FIELD OF THE INVENTION

The invention relates to the field of display technologies, and in particular to a display panel backlight unit with light guide plate shaped to cover light source.

BACKGROUND OF THE INVENTION

Multi-directional display devices are often in demand in public places such as plaza or shopping mall. In order to realize multi-directional displaying, multiple displays are usually arranged in various directions in the public places. This is a waste of resources.

At present, multi-facet displays for multi-directional displaying have been commercially available. These multi-facet displays are usually formed by splicing a plurality of individual displays. However, since each of the individual displays more or less have a frame at the time of displaying, a broader frame can be formed accordingly after a plurality of individual displays are spliced, seriously impacting on the displaying effect of the multi-facet display.

SUMMARY OF THE INVENTION

Aiming at above problems in the prior art, the disclosure proposes a display panel, a multi-facet display structure and a display device. The display panel can emit light rays generated by a light source from an entire first surface after the light rays are mixed by a light guide plate, so as to provide a backlight for a full surface of a display screen and thus to allow the full display screen to display images. Eventually, a frameless displaying for the display panel can be realized.

The disclosure provides a display panel, including a backlight unit and a display screen, the backlight unit including a back plate, a light guide plate and a light source, the light guide plate and the display screen being sequentially disposed on the back plate. The light guide plate has a first surface facing to the display screen and a second surface facing to the back plate, an orthographic projection of the first surface on the display screen coincides with the display screen and an orthographic projection of the second surface on the back plate coincides with the back plate, the light source is mounted on a side end surface of the light guide plate, and the first surface has an area larger than that of the second surface, such that the first surface covers the light source.

Preferably, a recess in which the light source is mounted is provided on the side end surface of the light guide plate.

Preferably, a cross-section of the recess is in the shape of an opened rectangle or an arc.

Preferably, the light source is mounted on the side end surface on at least one side of the light guide plate.

Preferably, the backlight unit further includes a transflective film which is interposed between the light guide plate and the display screen and an orthographic projection of which on the first surface coincides with the first surface; and the transflective film is configured to transmit and reflect light rays emitted from the first surface, such that the reflected light rays are incident to the light guide plate again.

Preferably, the backlight unit further includes an optical film which is interposed between the light guide plate and the display screen and an orthographic projection of which on the first surface coincides with the first surface; and the optical film is disposed above or below the transflective film, so as to perform an optical processing on the light rays transmitted through the light guide plate.

Preferably, the backlight unit further includes a bottom reflective sheet which is interposed between the back plate and the light guide plate and an orthographic projection of which on the back plate coincides with the back plate; and the bottom reflective sheet is configured to reflect the light rays which irradiate thereon to the light guide plate.

Preferably, the display panel further includes a fixing structure which have a U-shaped clamp and a bolt, the U-shaped clamp is configured to clamp edges of the backlight unit and the display screen which are laminated, and the bolt penetrates a sidewall of the U-shaped clamp arranged oppositely to the back plate and compressively fixes the backlight unit and the display screen.

The disclosure also provides a multi-facet display structure. The multi-facet display structure includes a plurality of display panels as described above. The plurality of display panels are spliced to form the multi-facet display structure, and the display screens of any two adjacent display panels are coupled seamlessly.

Preferably, the plurality of display panels are mutually spliced to form a multi-facet display structure in the shape of closed loop, and the display screens of the plurality of display panels are each faced outwardly of the multi-facet display structure in the shape of closed loop.

Preferably, the plurality of display panels are mutually spliced to form a multi-facet display structure in the shape of opened loop, and the display screens of the plurality of display panels are each faced outwardly of the multi-facet display structure in the shape of opened loop.

Preferably, the back plates of the plurality of display panels are formed integrally, the bottom reflective sheets of the plurality of display panels are formed integrally, and the butting side end surfaces of the light guide plates of any two adjacent display panels are coupled seamlessly.

Preferably, the fixing structure of the display panel is used to clamp and fix an edge of the display panel which is not butted to one another.

The disclosure also provides a display device. The display device includes the multi-facet display structure as described above.

The embodiments of the disclosure may have following advantages: in the display panel according to the disclosure, the first surface of the light guide plate facing to the display screen coincides with the display screen, the second surface of the light guide plate facing to the back plate coincides with the back plate, the first surface has an area larger than that of the second surface, the light source is disposed on the side end surface of the light guide plate, and the first surface covers the light source. Therefore, the light rays generated by the light source can be emitted from the entire first surface after the light rays are mixed by the light guide plate, so as to provide the backlight for the full surface of the display screen and thus to allow the full display screen to display the images. Eventually, the frameless displaying for the display panel can be realized.

In the multi-facet display structure according to the disclosure, by using the display panel as described above, the display panels in the multi-facet display structure can be coupled seamlessly, and thus the frameless displaying for the multi-facet display structure can be realized.

In the display device according to the disclosure, due to the use of the multi-facet display structure as described above, the display device can realize not only the multi-directional displaying but also the frameless displaying, thereby improving the displaying effect of the display device.

NUMERAL REFERENCE LIST

1—backlight unit; 11—back plate; 12—light guide plate; 121—recess; 13—light source; 14—transflective film; 15—optical film; 16—bottom reflective sheet; 2—display screen; 3—fixing structure; 31—U-shaped clamp; 32—bolt; and 4—display panel.

DETAILED DESCRIPTION OF THE EMBODIMENTS

In order to better understand the technical solutions of the disclosure by those skilled in the art, a display panel, a multi-facet display structure and a display device according to the disclosure will be further described in detail in conjunction with the accompanying drawings and specific embodiments.

First Embodiment

Figure 1:
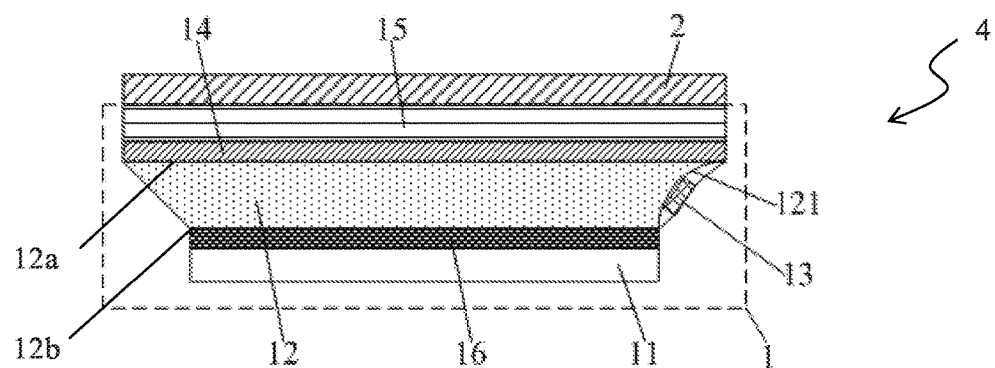
FIG. 1 is cross-section view showing a structure of a display panel according to a first embodiment of the disclosure.

There is provided a display panel 4 in this embodiment. As shown in FIG. 1, the display panel 4 includes a backlight unit 1 and a display screen 2. The backlight unit 1 includes a back plate 11, a light guide plate 12 and a light source 13. The light guide plate 12 and the display screen 2 are sequentially disposed on the back plate 11. The light guide plate 12 has a first surface 12a facing to the display screen 2 and a second surface 12b facing to the back plate 11. An orthographic projection of the first surface 12a on the display screen 2 coincides with the display screen 2, and an orthographic projection of the second surface 12b on the back plate 11 coincides with the back plate 11. The light source 13 is mounted on a side end surface of the light guide plate 12, and the first surface 12a has an area larger than that of the second surface 12b, such that the first surface 12a covers the light source 13.

In such an manner, light rays generated by the light source 13 can be emitted from the entire first surface 12a after the light rays are mixed by the light guide plate 12, so as to provide a backlight for a full surface of the display screen and thus to allow the full display screen to display images. Eventually, the frameless displaying for the display panel can be realized.

In this embodiment, a recess 121 in which the light source 13 is mounted is provided on the side end surface of the light guide plate 12. In such a manner, most of light rays emitted from the light source are allowed to be incident to the light guide plate 12, thereby improving use efficiency of the light rays.

In this embodiment, a cross-section of the recess 121 is in an arc shape. It should be noted that the cross-section of the recess 121 may also be in other shapes such as an opened rectangle, as long as the light source 13 can be received in the recess 121.

In this embodiment, the light source 13 is mounted on the side end surface on at least one side of the light guide plate 12. Generally, an increase in the number of the light sources 13 can improve luminance of the display panel at the time of displaying.

In this embodiment, the backlight unit 1 may further include a transflective film 14 which is interposed between the light guide plate 12 and the display screen 2 and an orthographic projection of which on the first surface 12a coincides with the first surface 12a. Moreover, the transflective film 14 is configured to transmit and reflect the light rays emitted from the first surface 12a, such that the reflected light rays are incident to the light guide plate 12 again. Since an included angle is formed between the light source 13 and the side end surface of the light guide plate 12, the light rays generated by the light source 13 are not perpendicularly incident to the light guide plate 12 but obliquely incident to the light guide plate 12. The transflective film 14 is arranged such that the light rays emitted from the light source 13 to be incident to light guide plate 12 are sufficiently mixed after being repeatedly reflected by transflective film 14. In such a manner, the light rays emitted from the light guide plate 12 could be more uniform, thereby improving the displaying effect of the display panel.

It should be noted that the ratio of light rays transmitted and reflected by transflective film 14 can be adjusted as required when the film is being prepared, as long as it can be ensured that the light guide plate 12 is able to uniformly and sufficiently mix the light rays generated by the light source 13.

In this embodiment, the backlight unit 1 may further include an optical film 15 which is interposed between the light guide plate 12 and the display screen 2 and an orthographic projection of which on the first surface 12a coincides with the first surface 12a. Moreover, the optical film 15 is disposed above the transflective film 14 so as to perform an optical processing on the light rays transmitted through the light guide plate 12 and the transflective film 14. The optical film 15 is arranged so as to further perform the optical processing (such as, refraction and reflection) on the light rays emitted from the light guide plate 12, thereby providing more uniform light rays.

It should be noted, herein, the optical film 15 may also be disposed below the transflective film 14. In such a manner, it is also possible to homogenize the light rays emitted from the light guide plate 12 without interference with the transmission and the reflection of the light rays by the transflective film 14.

In this embodiment, the backlight unit 1 may further include a bottom reflective sheet 16 which is interposed between the back plate 11 and the light guide plate 12 and an orthographic projection of which on the back plate 11 coincides with the back plate 11. Moreover, the bottom reflective sheet 16 is configured to reflect the light rays which irradiate thereon to the light guide plate 12. The bottom reflective sheet 16 is arranged so as to increase the use efficiency of the light rays emitted from the light source 13, thereby improving the displaying effect of the display panel.

Figure 2:
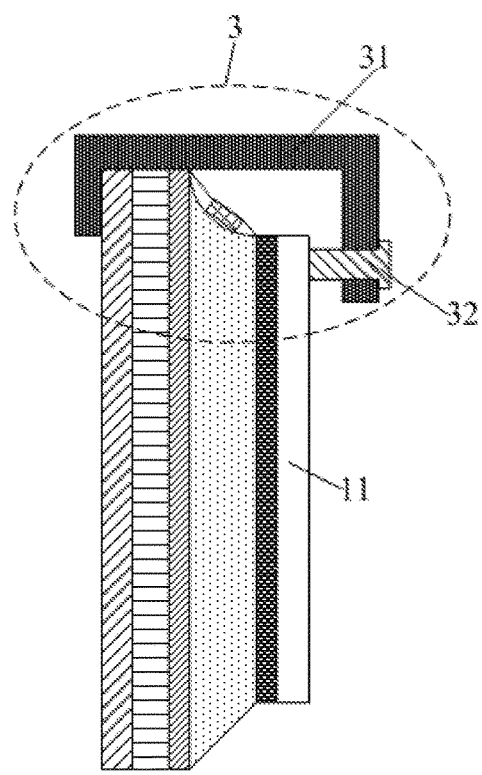
FIG. 2 is a schematic diagram showing a fixing structure of the display panel as shown in FIG. 1.

In this embodiment, as shown in FIG. 2, the display panel may further include a fixing structure 3 which have a U-shaped clamp 31 and a bolt 32. The U-shaped clamp 31 is configured to clamp edges of the backlight unit 1 and the display screen 2 which are laminated. The bolt 32 penetrates a sidewall of the U-shaped clamp 31 arranged oppositely to the back plate 11 and compressively fixes the backlight unit 1 and the display screen 2. The fixing structure 3 is arranged so as to firmly fix the backlight unit 1 with the display screen 2.

In addition, the fixing structure 3 may only fix a corner of the display panel. Further, the fixing structure 3 can be made very small, such that the fixing structure 3 could not shelter images displayed on the display panel while clamping and fixing the backlight unit 1 and the display screen 2. Preferably, the U-shaped clamp 31 is made of transparent materials such as plastic.

The first embodiment of the disclosure may have following advantages: in the display panel according to the first embodiment, the first surface of the light guide plate facing to the display screen coincides with the display screen, the second surface of the light guide plate facing to the back plate coincides with the back plate, the first surface has an area larger than that of the second surface, the light source is mounted on the side end surface of the light guide plate, and the first surface covers the light source. Therefore, the light rays generated by the light source can be emitted from the entire first surface after the light rays are mixed by the light guide plate, so as to provide the backlight for the full surface of the display screen and thus to allow the full display screen to display the images. Eventually, the frameless displaying for the display panel can be realized.

Second Embodiment

Figure 3:
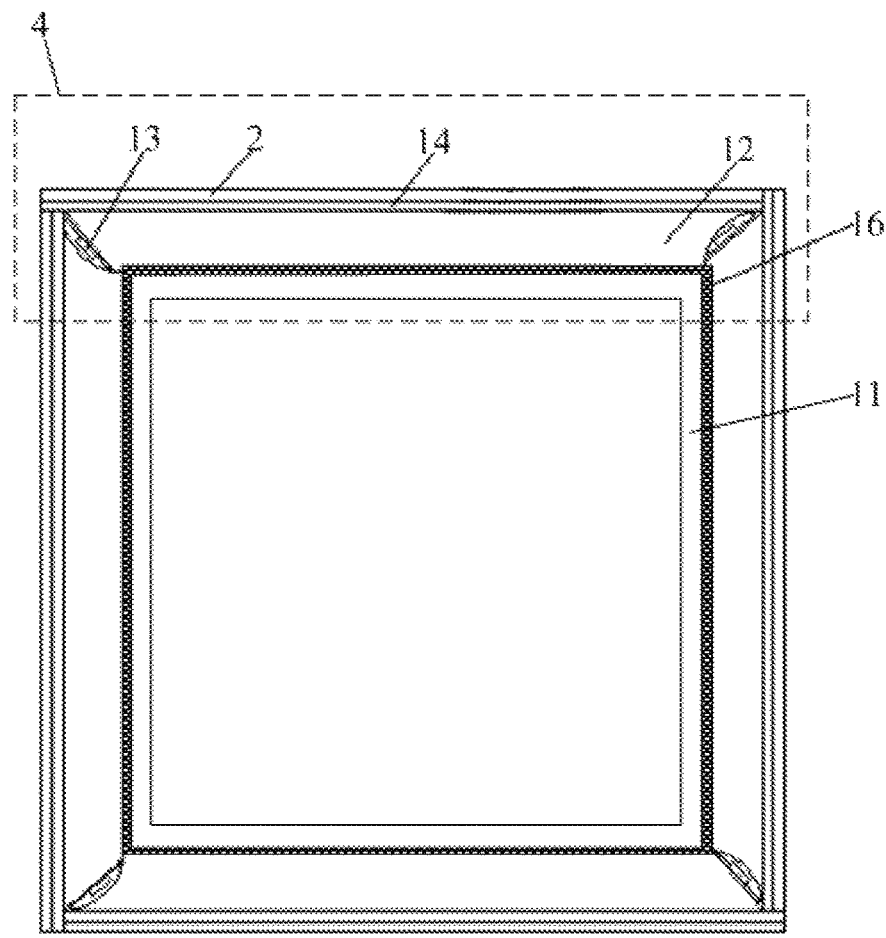
FIG. 3 is a schematic top view showing a multi-facet display structure according to a second embodiment of the disclosure.

In this embodiment, there is provided a multi-facet display structure. As shown in FIG. 3, the multi-facet display structure may include a plurality of display panels 4 according to the first embodiment. The plurality of display panels 4 can be spliced to form the multi-facet display structure and the display screens 2 of any two adjacent display panels 4 can be coupled seamlessly. Herein, the "coupled seamlessly" indicates a tight connection or a substantially tight connection formed between edges or the side end surfaces.

In such a manner, it is possible to realize a seamless connection between the butting display panels 4 in the multi-facet display structure, and thus the frameless displaying for the multi-facet display structure can be realized.

In this embodiment, as shown in FIG. 3, the plurality of display panels 4 can be mutually spliced to form a multi-facet display structure in the shape of closed loop, and the display screens 2 of the plurality of display panels 4 are each faced outwardly of the multi-facet display structure in the shape of closed loop. In such a manner, the multi-facet display structure can satisfy a requirement of displaying in multiple directions.

For example, the multi-facet display structure as shown in FIG. 3 is in the shape of rectangular loop spliced by four display panels 4. The display screens 2 of the four display panels 4 are faced outwardly of the rectangular loop, while the back plates 11 of the four display panels 4 are faced inwardly of the rectangular loop. The multi-facet display structure thereby can satisfy a requirement of displaying in four directions.

In this embodiment, the back plates 11 of the plurality of display panels 4 can be formed integrally, and the bottom reflective sheets 16 of the plurality of display panels 4 can be formed integrally. The butting side end surfaces of the light guide plates 12 of any two adjacent display panels 4 are coupled seamlessly. In such a manner, the over-all structure of the multi-facet display structure can become more stable.

In this embodiment, the fixing structure (not shown in FIG. 3) of the display panel 4 can be used to clamp and fix an edge of the display panel 4 which is not butted to one another. In such a manner, the seamless coupling can be realized between edges of the display panels 4 which are butted to one another, while the over-all structure of the multi-facet display structure spliced by the plurality of the display panels 4 can become more firm.

Third Embodiment

Figure 4:
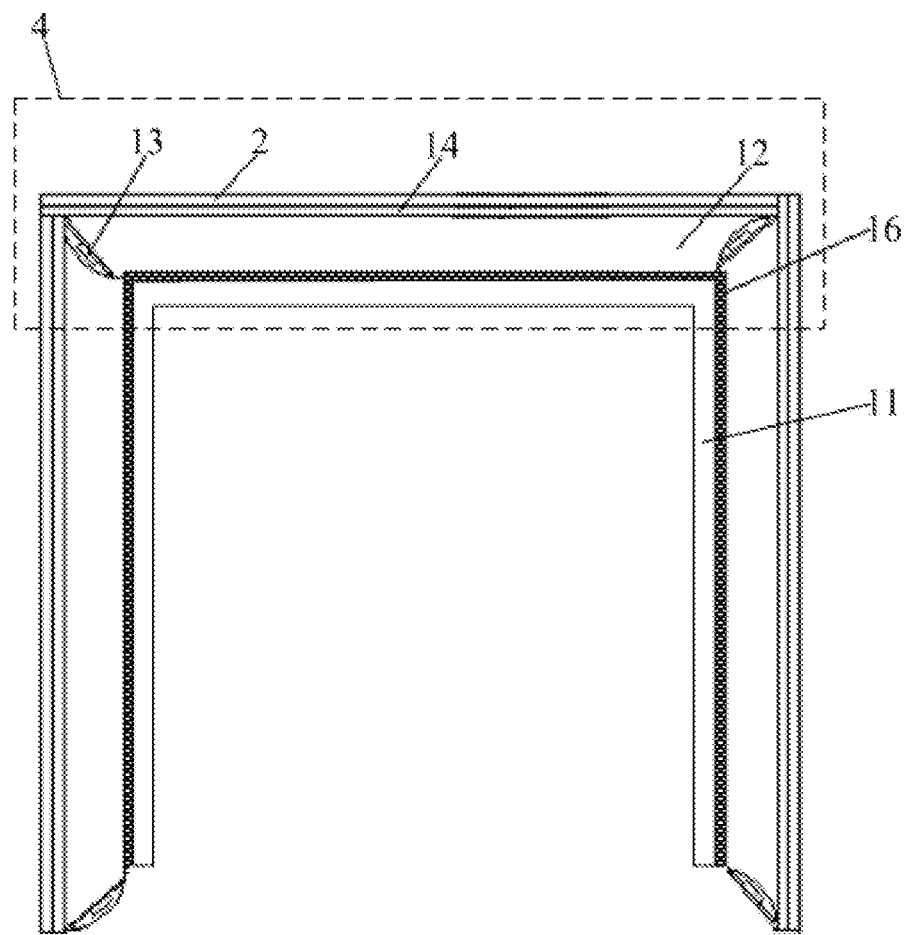
FIG. 4 is a schematic top view showing a multi-facet display structure according to a third embodiment of the disclosure.

There is provided a multi-facet display structure in this embodiment. This embodiment is different from the second embodiment in that, as shown in FIG. 4, the plurality of display panels 4 can be mutually spliced to form a multi-facet display structure in the shape of opened loop, and the display screens 2 of the plurality of display panels 4 are each faced outwardly of the multi-facet display structure in the shape of opened loop.

In this embodiment, other construction of the multi-facet display structure is the same as that in the second embodiment. The description thereof will be omitted herein.

The second and third embodiments of the disclosure have following advantages: in the multi-facet display structures according to the second and third embodiments, by using the display panels in the first embodiment, the display panels in the multi-facet display structure can be coupled seamlessly, and thus the frameless displaying for the multi-facet display structure can be realized.

The disclosure also provides a display device including the multi-facet display structure according to the second or third embodiment.

Due to the use of the multi-facet display structure according to the second or third embodiment, the display device can realize not only the multi-directional displaying but also the frameless displaying, thereby improving the displaying effect of the display device.

It should be understood that the above embodiments are merely exemplary embodiments for the purpose of illustrating the principle of the invention, and the invention is not limited thereto. Various modifications and improvements can be made by a person having ordinary skill in the art without departing from the spirit and the essence of the invention. Accordingly, all of the modifications and improvements also fall into the protection scope of the invention.

The invention claimed is:
1. A display panel, comprising:
a display screen; and
a backlight unit including
a back plate,
a light guide plate having a first surface facing to the display screen and a second surface facing to the back plate, and
a light source mounted on a side end surface of the light guide plate, wherein an orthographic projection of the first surface on the light guide plate coincides with the display screen, an orthographic projection of the second surface on light guide plate coincides with at least a portion of the back plate, and the first surface has an area larger than that of the second surface, such that the first surface covers the light source, and wherein the display panel further includes a fixing structure which has a U-shaped clamp and a bolt, the U-shaped clamp is configured to clamp edges of the backlight unit and the display screen which are laminated, and the bolt penetrates a sidewall of the U-shaped clamp arranged oppositely to the back plate and compressively fixes the backlight unit and the display screen.

2. The display panel according to claim 1, characterized in that, the backlight unit further includes a bottom reflective sheet which is interposed between the back plate and the light guide plate and an orthographic projection of which on the back plate coincides with the back plate; and the bottom reflective sheet is configured to reflect the light rays which irradiate thereon to the light guide plate.

3. The display panel according to claim 1, characterized in that, the backlight unit further includes a transflective film which is interposed between the light guide plate and the display screen and an orthographic projection of which on the first surface coincides with the first surface; and the transflective film is configured to transmit and reflect light rays emitted from the first surface, such that the reflected light rays are incident to the light guide plate again.

4. The display panel according to claim 3, characterized in that, the backlight unit further includes an optical film which is interposed between the light guide plate and the display screen and an orthographic projection of which on the first surface coincides with the first surface; and the optical film is disposed above or below the transflective film, so as to perform an optical processing on the light rays transmitted through the light guide plate.

5. The display panel according to claim 1, characterized in that, a recess in which the light source is mounted is provided on the side end surface of the light guide plate.

6. The display panel according to claim 5, characterized in that, a cross-section of the recess is in the shape of an opened rectangle or an arc.

7. The display panel according to claim 6, characterized in that, the light source is mounted on the side end surface on at least two sides of the light guide plate.

8. A multi-facet display structure, characterized in that, the multi-facet display structure includes a plurality of display panels according to claim 1, the plurality of display panels are spliced to form the multi-facet display structure, and the display screens of any two adjacent display panels are coupled seamlessly.

9. The multi-facet display structure according to claim 8, characterized in that, the backlight unit further includes a transflective film which is interposed between the light guide plate and the display screen and an orthographic projection of which on the first surface coincides with the first surface; and the transflective film is configured to transmit and reflect light rays emitted from the first surface, such that the reflected light rays are incident to the light guide plate again.

10. The multi-facet display structure according to claim 8, characterized in that, the backlight unit further includes an optical film which is interposed between the light guide plate and the display screen and an orthographic projection of which on the first surface coincides with the first surface; and the optical film is disposed above or below the transflective film, so as to perform an optical processing on the light rays transmitted through the light guide plate.

11. The multi-facet display structure according to claim 8, characterized in that, the plurality of display panels are mutually spliced to form a multi-facet display structure in the shape of closed loop or in the shape of opened loop, and the display screens of the plurality of display panels are each faced outwardly of the multi-facet display structure in the shape of closed loop.

12. The multi-facet display structure according to claim 11, characterized in that, the back plates of the plurality of display panels are formed integrally, the bottom reflective sheets of the plurality of display panels are formed integrally, and the butting side end surfaces of the light guide plates of any two adjacent display panels are coupled seamlessly.

13. The multi-facet display structure according to claim 8, characterized in that, the display panel further includes a fixing structure which have a U-shaped clamp and a bolt, the U-shaped clamp is configured to clamp edges of the backlight unit and the display screen which are laminated, and the bolt penetrates a sidewall of the U-shaped clamp arranged oppositely to the back plate and compressively fixes the backlight unit and the display screen.

14. The multi-facet display structure according to claim 13, characterized in that, the fixing structure of the display panel is used to clamp and fix an edge of the display panel which is not butted to one another.

15. A display device, characterized in that, the display device includes the multi-facet display structure according to claim 8.

16. The display device according to claim 15, characterized in that, the plurality of display panels are mutually spliced to form a multi-facet display structure in the shape of closed loop or in the shape of opened loop, and the display screens of the plurality of display panels are each faced outwardly of the multi-facet display structure in the shape of closed loop.

17. The display device according to claim 16, characterized in that, the back plates of the plurality of display panels are formed integrally, the bottom reflective sheets of the plurality of display panels are formed integrally, and the butting side end surfaces of the light guide plates of any two adjacent display panels are coupled seamlessly.

18. The display device according to claim 15, characterized in that, the display panel further includes a fixing structure which have a U-shaped clamp and a bolt, the U-shaped clamp is configured to clamp edges of the backlight unit and the display screen which are laminated, and the bolt penetrates a sidewall of the U-shaped clamp arranged oppositely to the back plate and compressively fixes the backlight unit and the display screen.

19. The display device according to claim 18, characterized in that, the fixing structure of the display panel is used to clamp and fix an edge of the display panel which is not butted to one another.

\* \* \* \* \*